Dec. 24, 1963  M. P. ELEFTHERION ET AL  3,115,234
FEEDING AND ORIENTING APPARATUS
Filed Aug. 27, 1962  3 Sheets-Sheet 2
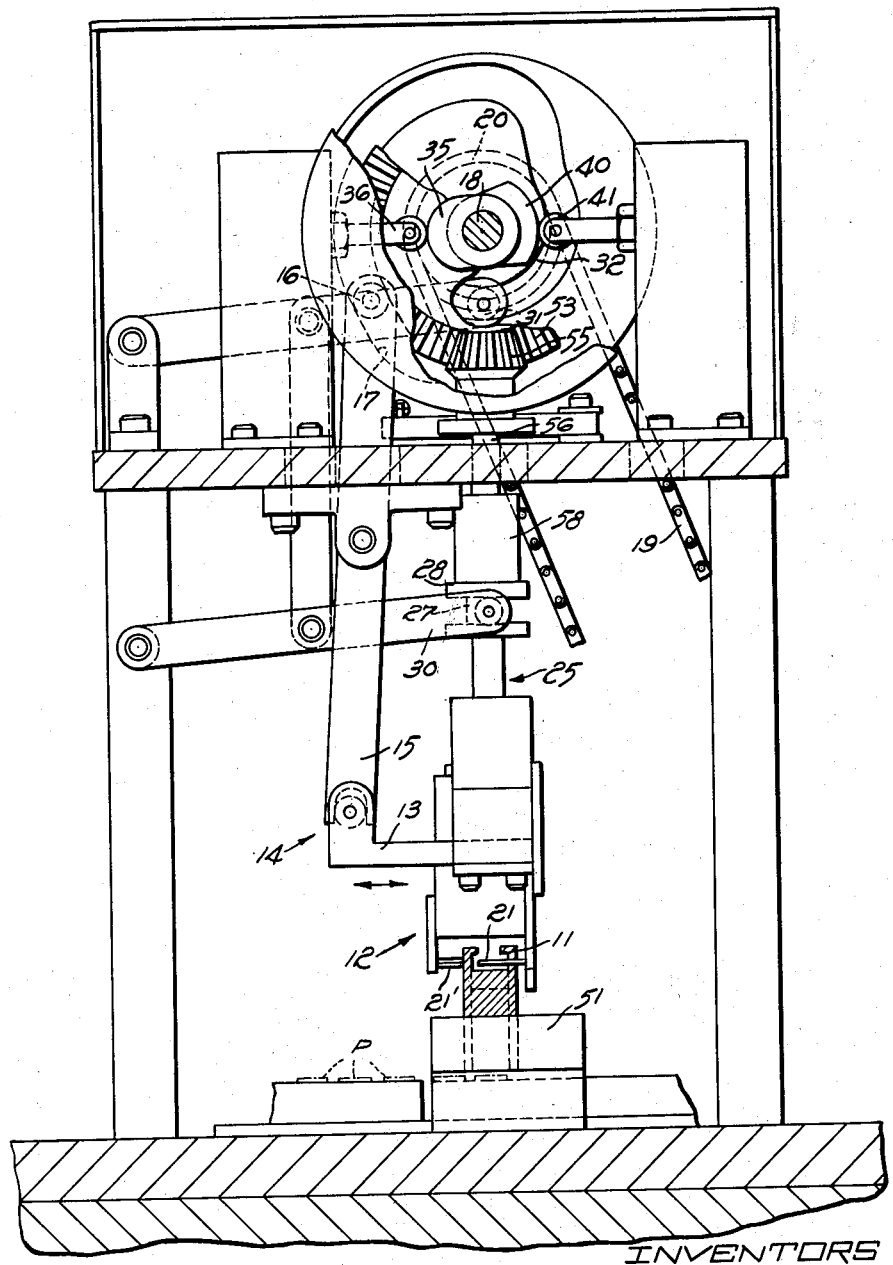
INVENTORS
M. P. ELEFTHERION
G. A. FRANK
R. K. MILLER
BY J. J. Lipari
ATTORNEY

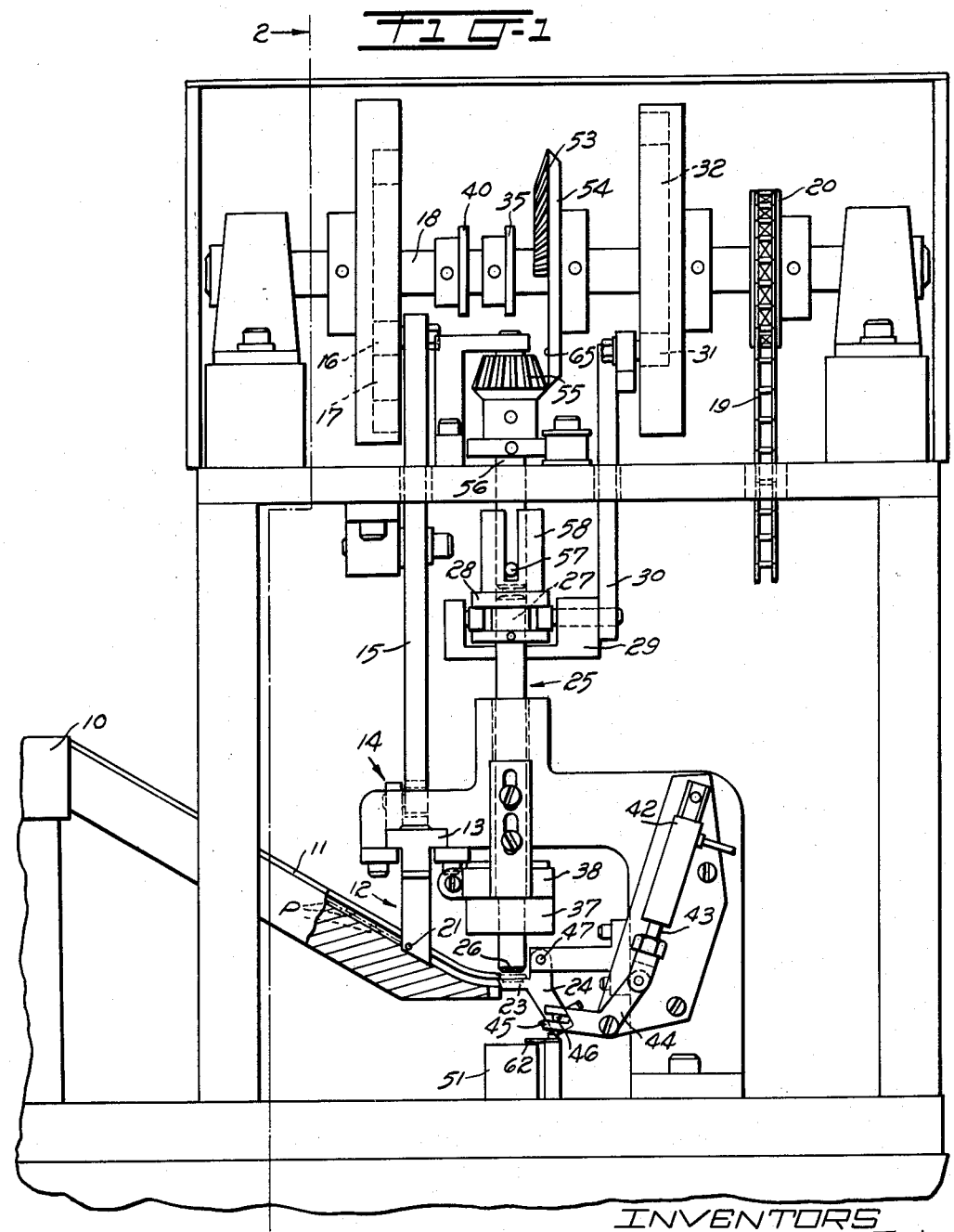

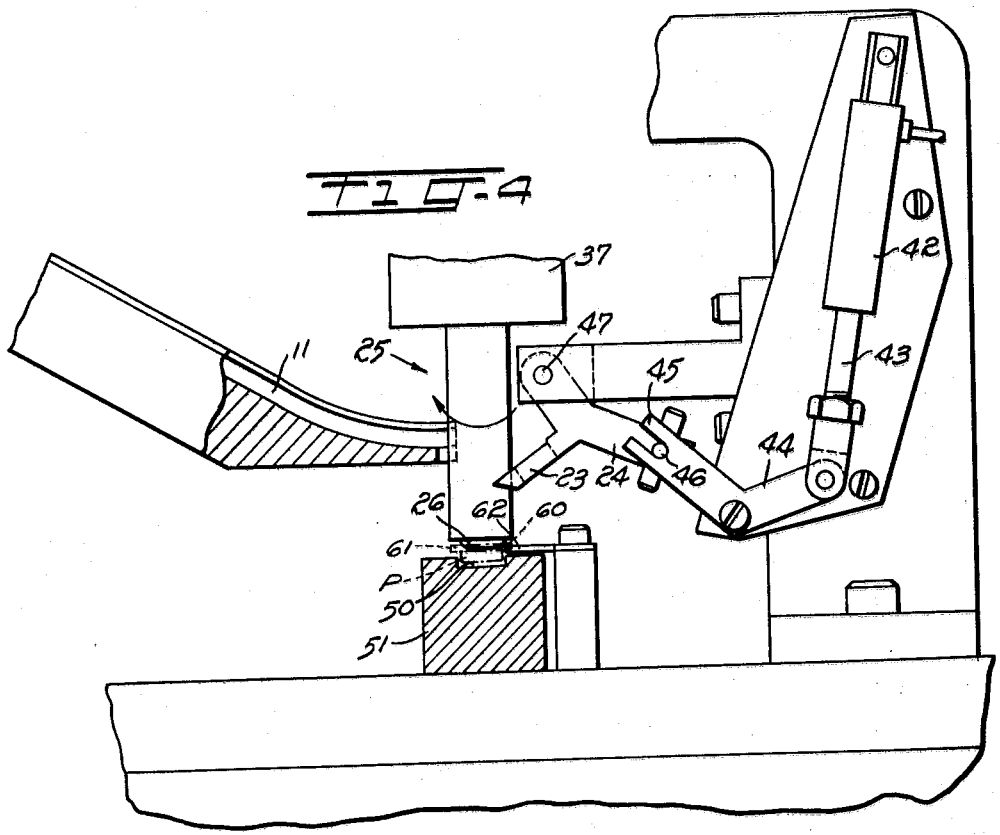

3,115,234
FEEDING AND ORIENTING APPARATUS
Michael P. Eleftherion, Emmaus, and Gerard A. Frank and Robert K. Miller, Allentown, Pa., assignors to Western Electric Company, Incorporated, New York, N.Y., a corporation of New York
Filed Aug. 27, 1962, Ser. No. 219,431
11 Claims. (Cl. 198—33)

This invention relates to feeding and orienting apparatus, and particularly to an apparatus for feeding and orienting articles such as header platforms utilized in semiconductor devices.

In the manufacture of semiconductor devices, such as transistors, one of the first operations required is the insertion of lead wires into openings of the header platform. Typically, this may involve locating wires less than ten thousandths of an inch in diameter into the platform openings which are only one thousandth of an inch larger than the wires. Manually, this operation is tedious and costly, and for large-scale production automatic assembly becomes necessary and profitable. An important phase of such automatic assembly, however, requires that the platforms be located in a precise oriented position for the subsequent reception of the lead wires in the platform openings.

Accordingly, the object of this invention is an apparatus for automatically feeding and orienting articles in an accurate and expeditious manner.

According to the general features of the invention, the articles are individually fed to a receiving means thereby enabling a movable magnetic unit to attract and transport the article towards an article holding device. The magnetic unit is then rotated whereupon the article strikes a stop element thereby orienting the article with respect to the article holding device.

In a preferred embodiment, the articles, hereinafter referred to as "platforms," are individually fed to a receiving unit disposed beneath a magnetizable rod. As the rod moves vertically downwards and approaches the platform, a first cam means causes the rod to be magnetized whereupon the pick-up end thereof attracts the platform. A second cam means then causes the receiving unit to be withdrawn from the path of the rod to permit the rod to pass to its down position. At the down position, a third cam means causes the rod to rotate whereupon a projecting tab on the platform engages an adjacently disposed stop member to stop and hold the platform in an oriented position with respect to a work holding device. Upon completion of the rotational movement of the rod, it is demagnetized to release the oriented platform in the holding device.

Other objects and a fuller understanding of this invention may be had by referring to the following description and claims, taken in conjunction with the accompanying drawings, in which:

FIG. 1 is a front view of the apparatus depicting the pick-up rod in the up position;

FIG. 2 is a view taken along lines 2—2 of FIG. 1;

FIG. 3 is a fragmentary plan view depicting a platform loaded in a receiving element;

FIG. 4 is an enlarged plan view of the platform projecting tab in engagement with the stop element in the oriented position; and FIG. 5 is a view of the pick-up rod ready to release the oriented platform in the work holding device.

With reference to the drawings, the apparatus includes a vibratory supply container 10 for holding and feeding platforms P down a chute 11. An escapement, generally referred to at 12, and seen in FIGS. 1 and 2, includes a reciprocatable slide 13 that is cam connected at 14 to a lever 15 having a cam follower 16 for travel about a cam 17 connected to a shaft 18 which is continuously rotated by a suitable conventional drive means (not shown) through a chain 19 and sprocket 20. A pair of pins 21, 21' (FIG. 2) are connected to the slide 13 in parallel relationship in such a manner that when slide 13 is moved to the left, pin 21 extends across chute 11 to block the leading platform P and succeeding platforms therein. Conversely, when slide 13 is moved to the right, pin 21' extends across the chute to block the second and succeeding platforms, pin 21 being retracted to permit the leading platform to slide down the chute into a semi-circular recessed portion 23 of a holder 24, as seen in FIG. 1.

A pick-up rod 25 with one end 26 located above the recessed portion 23 is provided at the other end 27 with a flanged yoke 28. A roller unit 29, disposed within yoke 28, is connected to a lever 30 provided with a cam follower 31 for travel about a cam 32 connected to the cam shaft. Thus, after a platform is located within holder recessed portion 23, the rod is caused to move downwardly towards the platform through the action of shaft 18 and cam 32.

As shaft 18 continues to rotate, another cam 35 (FIGS. 1 and 2) thereon engages a microswitch 36 which energizes a magnetic coil 37 located about and secured to the pick-up rod by a clamp 38. The coil magnetizes the rod causing it to attract the platform as it approaches the platform. After the rod grasps the platform, a cam 40 on shaft 18 contacts a microswitch 41 which, in turn, energizes an air cylinder 42 to extend a plunger 43 therefrom, the plunger being connected to holder 24 by linkage 44 having a bifurcated end portion 45 enveloping a pin 46 connected to the holder. As plunger 43 extends, the linkage pivots upwardly causing holder 24 to move downwardly about pivot pin 47 thereby resulting in the holder being removed from the path of the descending pick-up rod with the platform attached to its end portion 26.

The rod continues to its bottom position (FIG. 4) whereby the platform P is located slightly above a nest 50 in jig 51. At this time the teeth 53 of a segmental gear 54, (FIG. 1) connected to shaft 18 is in mesh with a pinion gear 55 connected to a shaft 56 having a pin 57 located between a slotted upper member 58 of yoke 28. The rotation of gear 55 causes the pick-up rod to rotate 360°. At some time during rotation of rod 25, a tab 60 (FIG. 5) projecting from the peripheral surface 61 of platform P engages an adjacently disposed adjustable stop member 62 thereby causing the platform to stop and be oriented with respect to jig nest 50, the orientation being such that the openings 63 in the platform are adapted to automatically receive elongated lead wires therein at a subsequent station (not shown). The rod continues through its 360° rotation, the rod pick-up end 26 sliding over the surface of the platform until gear teeth 53 stop meshing with pinion 55 and the flat surface 65 of gear 54 begins to pass thereby. Stop member 62 is provided with a pair of slots 66 for adjusting and locking the member by fastening elements 67 in any desired position with respect to the projecting tab 60 of platform P.

After the rod completes its rotational movement, cam 35 causes microswitch 36 to open which, in turn, de-energizes the magnetic coil 37. As a result, pick-up rod 25 is demagnetized causing the platform to be released therefrom into nest 50. The continued rotation of cam 32 causes rod 25 to retract upwardly to its normal starting position followed by cam 40 opening microswitch 41 to return holder 24 to its proper position at the bottom end of track 11 as plunger 43 retracts within cylinder 42. The apparatus is now ready to commence another cycle.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for feeding and orienting articles with respect to an article holding device, which comprises:
   means for feeding the articles,
   means for individually receiving an article from the feeding means,
   movable magnetic means for attracting and transporting the article from the receiving means towards the article holding device,
   means for rotating the magnetic means,
   stop means located near the magnetic means to stop the rotational movement of the article at a desired oriented position with respect to the article holding device during rotation of the magnetic means, and
   means for demagnetizing the magnetic means to release the oriented article into the article holding device.

2. Apparatus for feeding and orienting an article with respect to an article holding device, which comprises:
   means for individually feeding the articles,
   means for receiving an article from the feeding means,
   movable magnetic means for attracting and transporting the article from the receiving means towards the article holding device,
   means for removing the receiving means from the path of the magnetic means during its movement towards the article holding device,
   means for rotating the magnetic means near the article holding device,
   stop means located near the magnetic means to stop the rotational movement of the article at a desired oriented position with respect to the device during rotation of the magnetic means, and
   means for demagnetizing the magnetic means to release the oriented article into the article holding device.

3. In apparatus for transporting and orienting an article from a receiving element to an article holding device, the combination of:
   a rod having a pick-up end in predetermined relationship with the receiving element,
   means for magnetizing the rod to attract the article to said pick-up end,
   means for removing the receiving element from the path of the rod during its movement towards the holding device,
   means for rotating the rod near the article holding device, and
   a stop element located adjacent to the rotational path of said pick-up end adapted for engagement with a portion of the article to stop and hold the article in an oriented position with respect to the device as the rod continues its rotational movement, the rod demagnetizing upon completion of its rotational movement to release the oriented article in the article holding device.

4. In apparatus for transporting and orienting articles from a receiving element to an article holding device, the combination of:
   a rod having a pick-up end in axial alignment with the article in the receiving element,
   means for moving the rod towards the article,
   a magnetic coil connected to the rod,
   means for energizing the coil to magnetize the rod thereby causing the article to be attracted to the pick-up end,
   linkage means connected to and operable for removing the receiving element from the path of the rod to permit movement of the rod towards the holding device,
   means associated with the other end of the rod for rotation thereof,
   a stop element located adjacent to the rotational path of said pick-up end for engagement with a portion of the article to stop and hold the article in an oriented position with respect to the device as the rod continues its rotational movement, and
   means for de-energizing the coil to demagnetize the rod so that the article is released in the device in the oriented position.

5. In apparatus for transporting and orienting a transistor platform having an extending tab portion on its peripheral surface, from a receiving element to a work holding device, the combination of:
   a rod in axial alignment with the receiving element and having a pick-up end,
   a yoke connected to the other end of the rod,
   drive means cooperatively associated with the yoke for driving the rod towards the platform,
   a magnetic coil connected to the rod,
   means for energizing the coil to magnetize the rod thereby causing the platform to be attracted to the pick-up end,
   linkage means connected to and operable for removing the receiving element from the path of the rod to permit movement of the rod towards the holding device,
   gear means cooperatively associated with the yoke for rotating the rod, and
   a stop element located adjacent to the rotational path of said pick-up end for engagement with the platform extending tab to stop and hold the platform in an oriented position with respect to the device during the rotational movement of the rod, the coil then being de-energized to demagnetize the rod so that the platform is released in the device in the oriented position.

6. In apparatus for transporting and orienting a transistor platform having an extending tab portion on its peripheral surface, from a receiving element to a work holding device, the combination of:
   a rod in axial alignment with the receiving element and having a pick-up end,
   a yoke connected to the other end of the rod and having a slotted member extending therefrom,
   first cam means cooperatively associated with the yoke for driving the rod towards the platform,
   a magnetic coil connected to the rod,
   a second cam means for energizing the coil to magnetize the rod thereby causing the platform to be attracted to the pick-up end,
   linkage means connected to and operable for removing the receiving element from the path of the rod to permit movement of the rod towards the holding device,
   a gear having a shaft with a pin thereon extending through the slotted member,
   means for driving the gear to rotate the rod, and
   a stop element located adjacent to the rotational path of said pick-up end for engagement with the platform extending tab to stop and hold the platform in an oriented position with respect to the device during the rotational movement of the rod, the second cam means operating to de-energize the coil to demagnetize the rod so that the platform is released on the device in the oriented position.

7. In apparatus for transporting and orienting a transistor platform having an extending tab portion on its peripheral surface, from a receiving element to a work holding device, the combination of:
   a rod in axial alignment with the platform in the receiving element and having a pick-up end,
   a yoke connected to the other end of the rod and having a slotted member extending therefrom, first cam means cooperatively associated with the yoke for driving the rod towards the platform,
a magnetic coil connected to the rod,
second cam means for energizing the coil to magnetize the rod thereby causing the platform to be attracted to the pick-up end,
a fluid piston unit,
linkage means interconnecting the receiving element with the fluid piston unit,
third cam means for operating the piston unit to remove the receiving element from the path of the rod to permit movement of the rod towards the holding device,
a gear having a shaft with a pin thereon extending through the slotted member,
means for driving the gear to rotate the rod, and
a stop element located adjacent to the rotational path of said pick-up end for engagement with the platform extending tab to stop and hold the platform in an oriented position with respect to the device during the rotational movement of the rod, the second cam means operating to de-energize the coil to demagnetize the rod so that the platform is released on the device in the oriented position.

8. In apparatus for transporting and orienting a transistor platform having an extending tab portion on its peripheral surface, from a receiving element to a work holding device, the combination of:
a rod in axial alignment with the platform in the receiving element and having a pick-up end,
a yoke connected to the other end of the rod and having a slotted member extending therefrom,
first cam means cooperatively associated with the yoke for driving the rod from an up position to a down position near the platform,
a magnetic coil connected to the rod,
second cam means for energizing the coil to magnetize the rod thereby causing the platform to be attracted to the pick-up end,
a fluid piston unit,
linkage means interconnecting the receiving element with the fluid piston unit,
a pinion gear having a shaft with a pin thereon extending through the slotted member,
a continuously rotating segmental gear cyclically timed and having a teeth section for mesh with the pinion gear when the rod is in the down position to rotate the rod, and
a stop element located adjacent to the rotational path of said pick-up end for engagement with the platform extending tab to stop and hold the platform in an oriented position with respect to the device during the rotational movement of the rod, the second cam means operating upon the termination of the rotational movement of the rod to de-energize the coil to demagnetize the rod so that the platform is released in the device in the oriented position.

9. Apparatus according to claim 8 in which the segmental gear has a partially flat surface section to prevent the gear from meshing with the pinion gear during movement of the rod between the up and down positions, and the teeth section meshes with said pinion gear to rotate the rod 360° when the rod is in the down position.

10. Apparatus for feeding and orienting transistor platforms, having an extending tab portion from its peripheral surface, to a work holding device, which comprises:
means for feeding the platforms,
means for receiving a single platform from the feeding means,
a rod in axial alignment with the single platform and having a pick-up end,
a yoke connected to the other end of the rod,
drive means cooperatively associated with the yoke for driving the rod towards the platform,
a magnetic coil connected to the rod,
means for energizing the coil to magnetize the rod thereby causing the platform to be attracted to the pick-up end,
linkage means connected to and operable for removing the receiving element from the path of the rod to permit movement of the rod towards the holding device,
gear means cooperatively associated with the yoke for rotating the rod, and
a stop element located adjacent to the rotational path of said pick-up end for engagement with the platform extending tab to stop and hold the platform in an oriented position with respect to the device during the rotational movement of the rod, the coil then being de-energized to demagnetize the rod so that the platform is released in the device in the oriented position.

11. Apparatus for feeding and orienting transistor platforms having an extending tab portion from its peripheral surface, to a work holding device, which comprises:
means for feeding the platforms,
means for receiving a single platform from the feeding means,
a rod in axial alignment with the single platform and having a pick-up end,
a yoke connected to the other end of the rod and having a slotted member extending therefrom,
first cam means cooperatively associated with the yoke for driving the rod from an up position to a down position near the platform,
a magnetic coil connected to the rod,
second cam means for energizing the coil to magnetize the rod thereby causing the platform to be attracted to the pick-up end,
a fluid piston unit,
linkage means interconnecting the receiving means with the fluid piston unit,
a pinion gear having a shaft with a pin thereon extending through the slotted member,
a continuously rotating segmental gear cyclically timed and having a teeth section for mesh with the pinion gear when the rod is in the down position to rotate the rod, and
a stop element located adjacent to the rotational path of said pick-up end for engagement with the platform extending tab to stop and hold the platform in an oriented position with respect to the device during the rotational movement of the rod, the second cam means operating upon termination of the rotational movement of the rod to de-energize the coil to demagnetize the rod so that the platform is released in the device in the oriented position.

References Cited in the file of this patent
UNITED STATES PATENTS
2,724,484    McCoy _____ Nov. 22, 1955
FOREIGN PATENTS
627,441    Canada _____ Sept. 12, 1961